Dec. 6, 1955     T. W. MULLEN ET AL     2,725,665

SAFETY RODENTICIDE FEEDER

Original Filed Feb. 2, 1952

INVENTORS,
THOMAS W. MULLEN,
THOMAS W. MULLEN JR,
By Herbert A. Minturn,
ATTORNEY

United States Patent Office 2,725,665
Patented Dec. 6, 1955

2,725,665
SAFETY RODENTICIDE FEEDER

Thomas W. Mullen and Thomas W. Mullen, Jr.,
Evansville, Ind.

Original application February 2, 1952, Serial No. 269,636, now Patent No. 2,690,029, dated September 28, 1954. Divided and this application August 3, 1954, Serial No. 447,493

4 Claims. (Cl. 43—131)

This application is a division from our pending application Serial No. 269,636, allowed April 5, 1954.

This invention relates to a dispensing device to dispense in stick form, that is in a more or less solid form, molded into a stick, of a rodenticide. One primary rodenticide intended to be dispensed by the structure is that which carries the chemical 3-(alpha-acetonylbenzyl)-4-hydroxy-coumarin. This is a chemical which is described in U. S. Patent No. 2,427,578, issued September 16, 1947, as an excellent rodenticide operating by the principle of not primarily poisoning the rodent, but affecting the blood stream in such manner that the coagulating factor is so disturbed or upset that internal hemorrhages are produced in the rodent eating the material.

The chemical above referred to requires to be administered to the rodents in a mixture of some sort wherein the percentage of the chemical is quite low in comparison with the total amount of the bait to be dispensed. Heretofore, it has been quite common to dispense the chemical in baits which are "dry-flowing," that is wherein the bait has its primary basis to be a cereal such as corn meal, oats in some form, and the like, such being grains normally available to rats and mice.

However, it is now conceived that the chemical might be administered in a form easier to handle and easier to dispense, namely incorporated in some material which may be molded or extruded in to any desirable form, herein described as a "stick" meaning thereby that the material is in a column having a length greatly exceeding its cross section dimension.

Such material may embody meat products, moistened and compressed cereals, or even dehydrated vegetables, all such material being that which is readily eaten by the rodents. The sticks may be molded or extruded, to have either a casing such as would be comparable to Bologna sausage, or may be in such form as to require no external casing.

A primary purpose of the invention is to provide a structure which may be readily filled with the bait; which will readily present the bait to the rodents in a form which will be self-feeding as the bait is devoured, with the protection that the entire piece of the bait may not be carried away; and wherein the bait will be protected against consumption by animals other than the rodents desired to be killed.

Other advantages of the invention will become apparent to those skilled in the art in the following description of the invention in reference to the accompanying drawings, in which—

Figure 1:
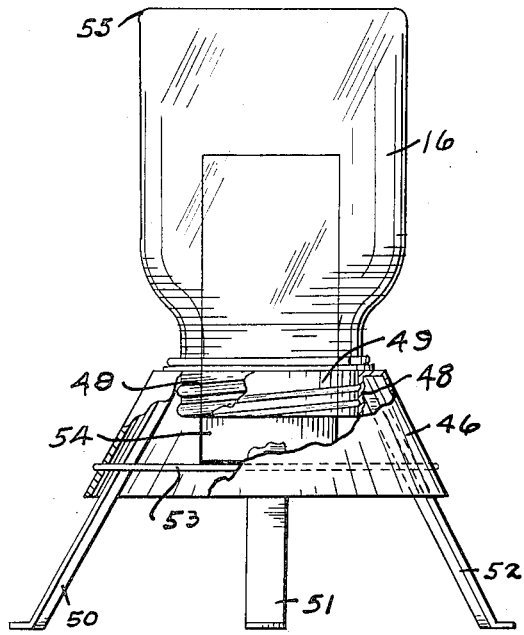
Fig. 1 is a view in side elevation and partial section of a structure embodying the invention.
Figure 2:
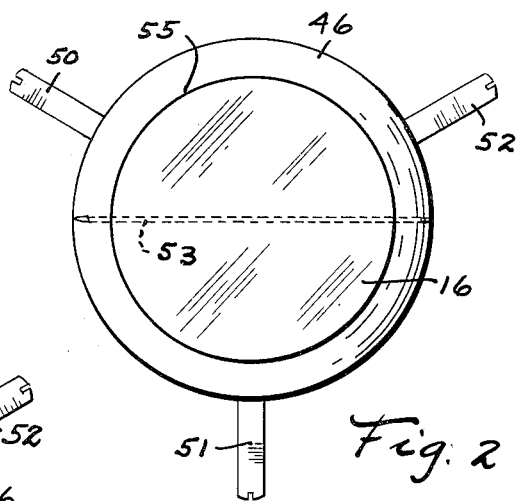
Fig. 2 is a view in top plan.
Figure 3:
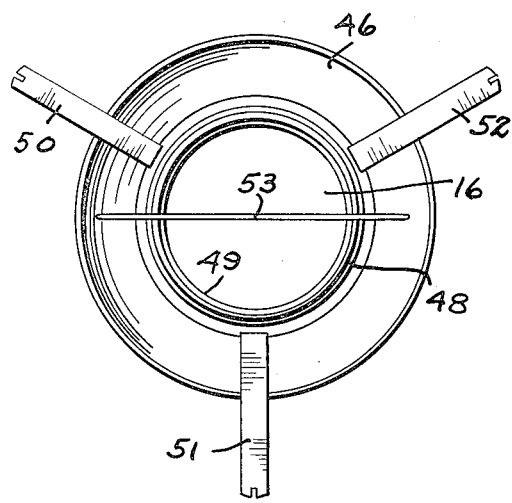
Fig. 3 is a view in bottom plan.

A frusto-conical section 46 is formed to be open at both its top and bottom ends. There is a generally tubular downturned portion 48 preferably integrally turned from the wall of the section 46, this portion 48 being screw-threaded to receive therein the lower end 49 of a receptacle 16. That is, the receptacle 16 herein shown as being a glass jar in the nature of a Mason jar is screw-threadedly engaged in the member 48 to be supported in an inverted position.

The conical section 46 is provided with a plurality of legs, herein shown as three in number and designated by the numerals 50, 51 and 52.

A wire or bar 53 is fixed to extend diametrically across the conical member 46 near its lower portion, herein shown as being extended through the wall of the member 46 on each side. The wire 53 is spaced below the lower end of the threaded portion 49 of the container 16 a distance which will permit a stick form of bait 54 normally carried within the receptacle 16 to drop downwardly through the end 49 and rest on the wire 53 so as to expose a short length of the stick around its lower end whereby the rodents may gnaw on that lower end. Normally this distance of the wire 53 from the lower end of the container end 49 would be around about one-inch, this distance however not being critical as long as there is exposed a sufficient length of the stick 54 so as to permit the rodents to have access to that lower end portion.

The lengths of the legs 50—52, being extended from the lower end of the member 46 with slopes corresponding to the slopes of the wall of that member, are such that when the device may be kicked or knocked over, the device will come to rest upon the lower extreme ends of two adjacent legs and the upper edge 55 of the container so that there will be an angle of respose in respect to this container 16 which will cause the stick 54 to drop back down into the container 16 to be beyond contact at its lower end by animals reaching through the then exposed lower opening into the member 46. Also the presence of the wire 53 will prevent a dog or pig or the like from extending its nose into the opening of the container 16.

While we have herein shown and described our invention in this one particular form, it is obvious that structural changes may be employed particularly in the bait container as well as in the member 46 without departing from the spirit of the invention, and we therefore do not desire to be limited to that precise form beyond the limitations which may be imposed by the following claims.

We claim:

1. A stick form rodenticide dispenser comprising an open ended shell-like member; a container carried by and extending above the member having an open end portion discharging into said member; a bar carried across said container and spaced below said open end portion and also spaced above the lower open end of the member; said bar being carried by said member substantially diametrically of said container; and member supporting means comprising spaced apart legs extending downwardly and outwardly from said member a distance to insure said container coming to an angle of repose with its open end directed upwardly from the horizontal upon the dispenser being overturned.

2. The structure of claim 1 in which said member is frusto-conical in shape, said bar is fixed to said member, and said container is removably carried by said member.

3. The structure of claim 1 in which said member is frusto-conical in shape and said legs follow the slope of the wall thereof.

4. A stick form rodenticide dispenser comprising a normally upright receptacle having a lower open end portion, said open end portion being adapted to freely receive a stick of rodenticide; means receiving and holding the lower end of the stick with a short length exposed from the container end; a slide shield spaced around the exposed stick length; and means adapted to support the container at an angle of repose with its open end higher than its opposite end to induce longitudinal travel by gravitation of said stick toward said opposite end to remove said length from external exposure upon said dispenser being turned over.

References Cited in the file of this patent

UNITED STATES PATENTS 382,048     Linder et al. _____ May 1, 1888